(12) United States Patent
Johnson

(10) Patent No.: US 6,911,754 B2
(45) Date of Patent: Jun. 28, 2005

(54) CONTROL OF ELECTRO-MAGNETS

(75) Inventor: Frederick A Johnson, Sevenoaks (GB)

(73) Assignee: BAE SYSTEMS Electronics Limited, Farnborough (GB)

( * ) Notice: Subject to any disclaimer, the term of this patent is extended or adjusted under 35 U.S.C. 154(b) by 0 days.

(21) Appl. No.: 10/384,772

(22) Filed: Mar. 11, 2003

(65) Prior Publication Data

US 2004/0080895 A1 Apr. 29, 2004

Related U.S. Application Data

(63) Continuation of application No. 09/673,354, filed as application No. PCT/GB00/03327 on Aug. 31, 2000, now abandoned.

(30) Foreign Application Priority Data

Sep. 3, 1999 (GB) .............................. 9920782

(51) Int. Cl.⁷ ........................ H02K 7/09; H01H 47/00
(52) U.S. Cl. ................ 310/90.5; 310/51; 361/143
(58) Field of Search ................. 361/143, 144, 361/141; 104/286, 284, 282, 285; 310/90.4, 90.5, 50, 51; 318/134, 135, 114, 587, 115, 128

(56) References Cited

U.S. PATENT DOCUMENTS

| 4,808,863 A | | 2/1989 | Andersson | |
|---|---|---|---|---|
| 4,897,582 A | | 1/1990 | Otten et al. | |
| 5,058,505 A | * | 10/1991 | Uehira | ........................ 104/284 |
| 5,133,527 A | * | 7/1992 | Chen et al. | .................. 248/550 |
| 5,219,037 A | * | 6/1993 | Smith et al. | ................. 180/312 |
| 5,387,851 A | * | 2/1995 | Nuscheler et al. | ........... 318/135 |
| 5,467,718 A | * | 11/1995 | Shibata et al. | ............... 104/284 |
| 5,570,286 A | | 10/1996 | Margolis et al. | |
| 5,631,506 A | * | 5/1997 | Paden | .......................... 310/51 |
| 6,127,757 A | * | 10/2000 | Swinbanks | .................. 310/90.5 |

FOREIGN PATENT DOCUMENTS

| EP | 0 218 318 | 4/1987 |
|---|---|---|
| EP | 0 789 160 | 8/1997 |
| GB | 2 259 158 | 3/1993 |
| GB | 2 311 627 | 10/1997 |

* cited by examiner

*Primary Examiner*—Rajnikant B. Patel
(74) *Attorney, Agent, or Firm*—Nixon & Vanderhye P.C.

(57) ABSTRACT

A support actuator 20 comprises an electro-magnet 21 having an input current 22, provided through a current controller 23, and which is arranged to generate a magnetic field 24 having a variable intensity proportional to a variable current 25 supplied by the controller 23. The intensity of the field 24 is controlled to ensure that the magnet 21 is separated from a support armature 26 arranged to carry a load by an operational gap 27.

A load cell 28 is connected between the armature 26 and a mounting position 29 for the armature 26. The cell 28 produces a control signal 30 representing variations in force generated by the magnetic field 24 which acts on the load, and the signal 30 is fed backward, along a feedback control path 31 to the controller 23 so as to control the variable current 25 such that it is made substantially equal to a gain demand force D.

21 Claims, 4 Drawing Sheets

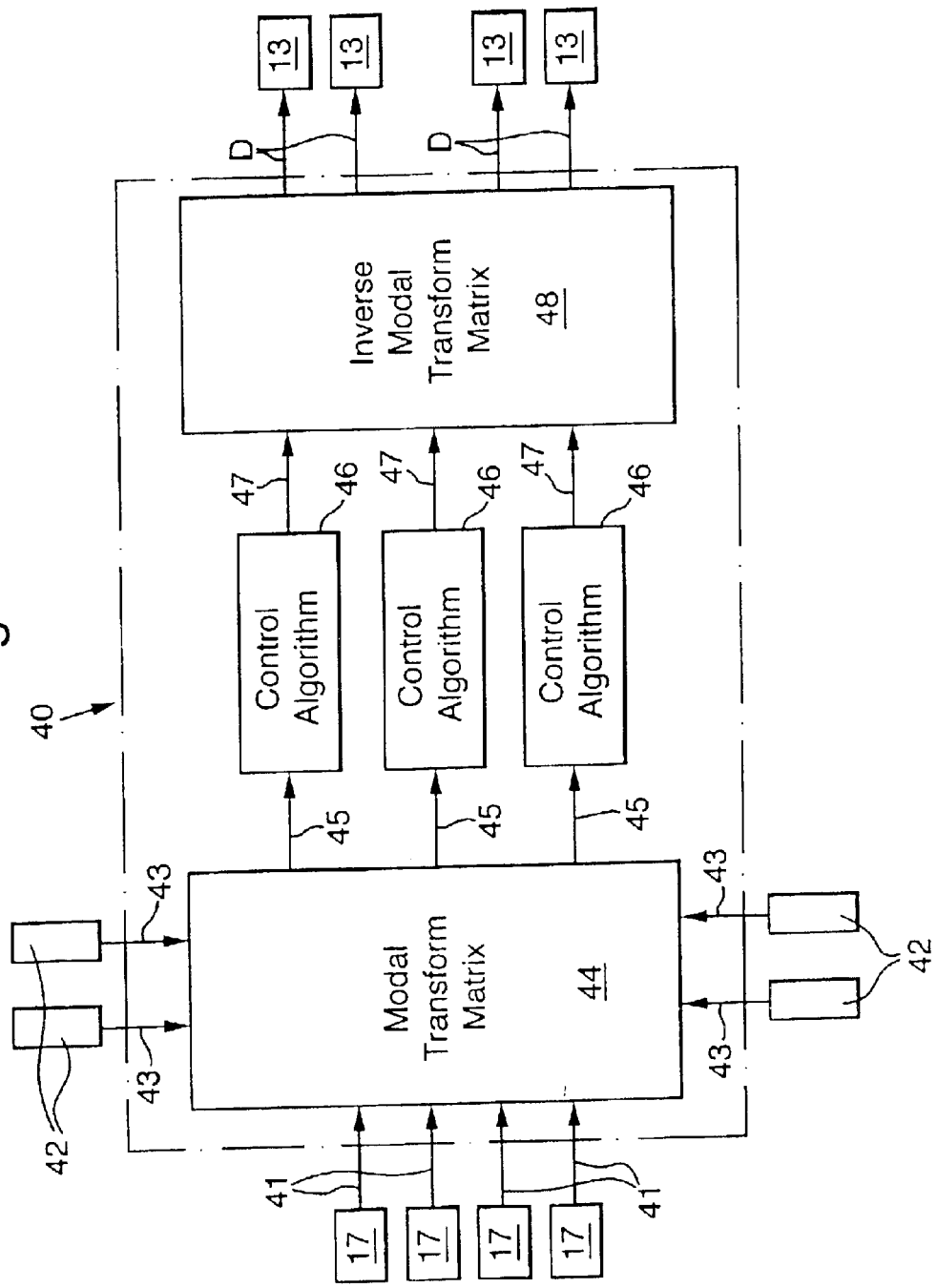

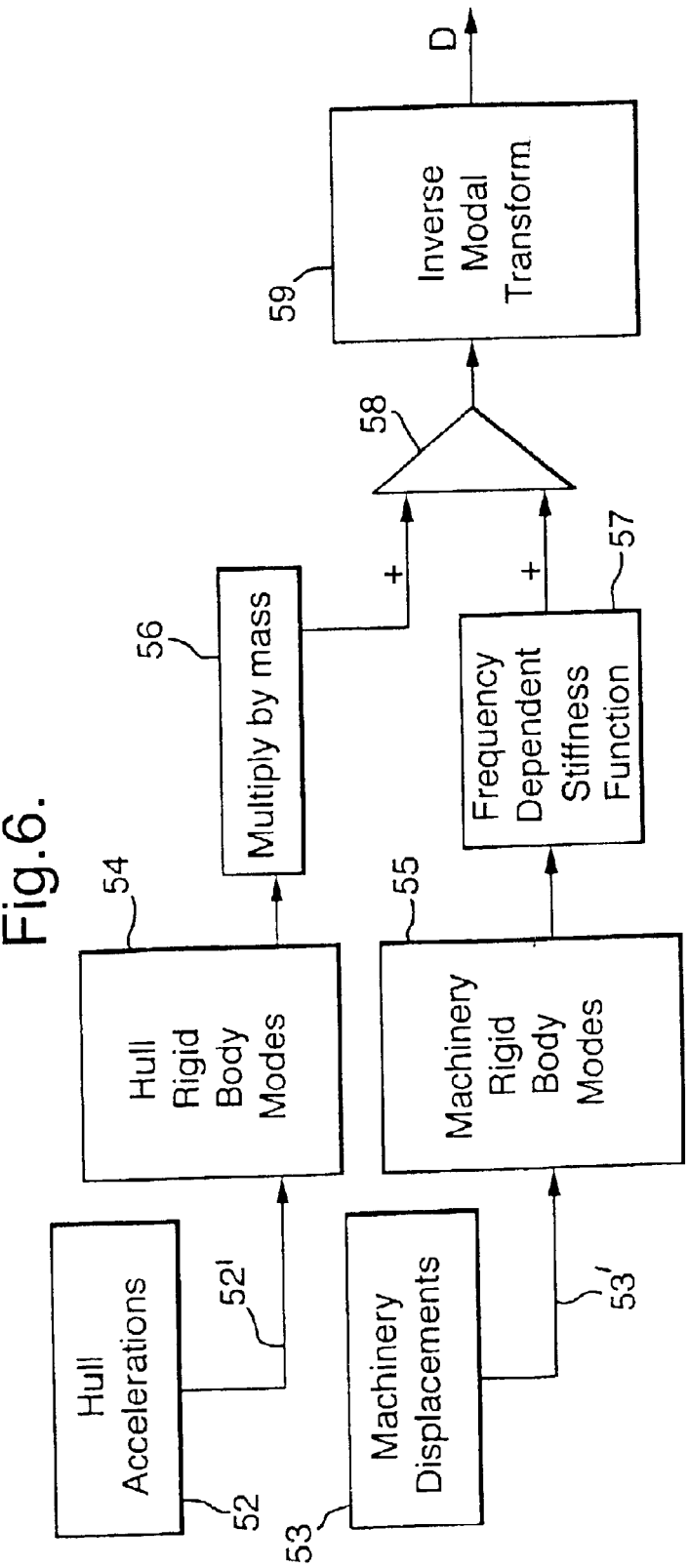

CONTROL OF ELECTRO-MAGNETS

This application is a continuation of application Ser. No. 09/673,354, filed Oct. 16, 2000, which is the U.S. national phase of international application PCT/GB00/03327, filed in English on Aug. 31, 2000 which designated the U.S. PCT/GB00/03327 claims priority to GB Application No. 9920782.1. The entire contents of these applications are hereby incorporated by reference in this application.

The present invention relates to mountings for the support of loads on supporting structures and more particularly relates to mountings for the support of machines in vessels.

Passive springs, or rubber mounts, are traditionally used to support machines in vessels and to minimise the transmission of machinery noise to the hull of such vessels. There is a basic design compromise between restraining the motion of the machinery relative to the hull and vibration isolation. Stiffer springs restrain the machinery motions better but degrade the isolation performance and vice versa. Further the force transmitted to the hull is solely dependent on the local displacement from the springs equilibrium position and the frequency of the vibration.

Substantial improvements in the mounting of machines in vessels have become possible by the use of electromagnetic levitation support mountings and by the addition of electronic control of such electro-magnetic mounts hereinafter referred to as "support actuators".

The present invention relates specifically to support actuators and methods of spatially coupling electro-magnets to support armatures such that movement of either the electro-magnet or support armature does not substantially change the force acting between the electro-magnet and the support armature. Furthermore, the invention relates to a support apparatus comprising a plurality of support actuators.

At present, it is possible to magnetically couple a vibrating load support armature to a datum structure above it using an electro-magnet mounted to the datum. The electro-magnet when energised with a suitable fixed current produces a magnetic field which exerts an attraction force on the support armature so as to attract the support armature upwards towards the electro-magnet when the support armature is positioned within the magnetic field. The attraction force is opposed by the force of gravity acting on the load. It should be understood that there is a physical gap between the support armature and the electro-magnet and that vibrations of the load mounted to the support armature will cause variations in the physical gap as it vibrates.

An electro-magnet may be considered a dual input, single output device. The output being the attraction force exerted by the magnetic field on the support armature. The attraction force is dependent on the inputs, the first being a current which is used to energise the electro-magnet and the second being dependent on the magnitude of the gap. For example, the attraction force exerted on the support armature increases as the support armature is positioned closer to the electro-magnet i.e. the magnitude of the gap is reduced, and decreases as it is positioned further from the electro-magnet i.e. the magnitude of the gap is increased. The attraction force exerted by an electro-magnet on a support armature is analogous to a strong negative spring.

However, when using the same electro-magnetic actuator to support a structure in a spaced relationship with respect to a datum and to inhibit or dampen resonances in the structure caused by the effect of vibrations of the structure, additional forces have to be introduced between the support armature and the electro-magnet. The generation of these additional forces inevitably compromises the vibration isolation between the support armature and the electro-magnet.

In one known support actuator, high gain feedback control from a magnetic flux sensor is employed on the electro-magnet in an attempt to convert the strong negative spring into a weak negative spring so that more precise control of the attraction force of the electro-magnet can be applied. However, the high gain feedback cannot be maintained over an infinite range of load vibration frequencies and in practice the gain of the feedback drops towards zero with increasing frequency. This effect, sometimes referred to as "roll off", causes a change in phase and the weak negative spring then tends to behave more like a negative damper in this roll-off frequency range. This in turn feeds energy into variations in the physical gap which can readily excite any structural resonance in this roll-off frequency range and generate undesirable resonances in the supported structure.

The above disadvantages have been overcome in a further known system in which a gap sensor or proximeter is arranged to detect variations in the physical gap so as to anticipate flux density variations in the magnetic field. The output of the proximeter is used to provide a feedforward control signal to a current controller that provides a variable current to the electro-magnet. A feedback control from a flux sensor, which measures the actual variations in magnetic fluxdensity, can also be used to control the current controller so as to refine the signal provided by the feedforward control arrangement.

By determining the correct transfer function for the current controller, the feedforward control radically changes the characteristics of the electro-magnet such that it behaves like a weak positive spring with phase shifts associated with increasing frequency thus causing the electro-magnet to behave as a positive damper. The feedforward control path can have a very wide bandwidth, which is wider than that provided by a simple feedback control, but the precision of control is dependent on the precision of measurement of the physical gap used to determine the transfer function.

The high gain feedback control provided by the flux sensor further modifies the characteristics of the electro-magnet to make it behave like an even weaker positive spring. Therefore, when the feedback control from the flux sensor rolls off with increasing frequency, the associated phase shifts caused by the feedforward control from the gap sensor generates positive damping in the electro-magnet which extracts energy from any variations in the physical gap in the roll off frequency range. Therefore any structural resonance in the roll off frequency range will be dampened and will not generate further resonance in the support armature.

However, while detecting flux density generated by an electro-magnet has been successful for measuring force changes for small variations in the physical gap, it fails to measure force changes for larger variations in the physical gap. The inventor has realised that this is a consequence of the magnetic field changing its shape as well as its strength with large gap variations such that measuring flux density variations no longer reflects the actual force change.

Furthermore, control of structural resonance, produced by a vibrating load, between an electro-magnet and a support armature has until now required the generation of additional forces between the electro-magnet and support armature. However, generation of such forces suffers from the disadvantage of compromising vibration isolation between the support armature and electro-magnet.

It is an object of the present invention to obviate or mitigate the disadvantages associated with the known support actuators described above.

According to a first aspect of the invention a support actuator, comprises a current controller operable to produce a variable current, an electro-magnet connected to receive the variable current and to generate a magnetic field dependant on the variable current, a support armature separated from the electro-magnet by an operational gap and supported by the magnetic field, and a first control means arranged to detect force generated by the electro-magnet and to operate the current controller dependant on variations in the force generated, and the first control means being arranged to vary the variable current in the electro-magnet such that the force generated substantially equals a given force demand value whilst permitting large variations of the operational gap.

In this manner, the force generated by an electro-magnet can be measured directly and varied to substantially equal a given force demand value. The force generated is independent of the operational gap between the electro-magnet and its associated support armature. That is vibration isolation is maintained as there is no change in force generated by the support actuator as a consequence of resonance in the support armature. It will be understood that the support armature will normally have mounted thereto a load which will vibrate and may cause resonance and that the resonance of the support armature is a response to resonance of the vibrating load to which it is attached. In the context of this specification the force demand value is that value determined by a separate global system in order to selectively control a particular rigid body mode of a structure supported by one or more of the support actuators. Each support actuator allows control of the force generated by an electro-magnet over larger frequency ranges and over larger amplitude gap variations than is possible using a simple feedback control from a magnetic flux sensor or using a combination of feedforward control from a gap sensor and a feedback control from a flux sensor. Furthermore, each support actuator does not generate additional forces between the electro-magnet and support armature.

The first control means may comprise a strain gauge arranged to detect the force generated by the electro-magnet The first control means may also be arranged to generate a first control signal dependant on the force, and the first control signal may be arranged to operate the current controller. The first control means may be arranged in a feedback path from the strain gauge to the current controller. The strain gauge may be arranged between the support armature and a mounting position for the support armature. The strain gauge may be a load cell.

Preferably, a second control means may be arranged to detect variations in the operational gap and to operate the current controller dependant on variations in the operational gap so as to anticipate force variations, the second control means may also be arranged to vary the current in the electro-magnet whereby the force is maintained substantially constant whilst permitting the operational gap to vary. The second control means may comprise a gap sensor arranged to detect variations in the operational gap The second control means may also be arranged to generate a second control signal dependant on variations in the operational gap, and the second control signal may also be arranged to operate the current controller. The second control means may be arranged in a feedforward path from the gap sensor to the current controller. The operation of the current controller may be determined by a transfer function of a relationship between the given force demand value, the second control signal and the variable current applied to the electro-magnet, and the current controller is arranged to produce the variable current dependant on the transfer function.

The support actuator may be arranged to isolate vibration forces between a load carried by the electro-magnet and a support structure to which the support armature is mounted or, alternatively, the support actuator may be arranged to isolate vibration forces between a load carried by the support armature and a support structure to which the electro-magnet is mounted.

The structures carrying the support armature and the electro-magnet may be mechanically and resiliently interconnected for example by one or more mechanical springs. In this case the strain gauge or load cell is arranged to measure the net force generated by the springs and the electro-magnet. These springs assist with supporting some of the load and reduce the size of the electro-magnet required.

According to a second aspect of the invention a support apparatus having a plurality of support actuators wherein a vibrating load is mounted to a raft and the support actuators are arranged in an array between the raft and a support structure so as to support the raft, wherein each support actuator comprises a current controller operable to produce a variable current, an electro-magnet connected to receive the variable current and to generate a magnetic field dependant on the variable current, a support armature separated from the electro-magnet by an operational gap and supported by the magnetic field, a first control means arranged to detect force generated by the electro-magnet and to operate the current controller dependant on variations in the force generated, and the first control means being arranged to vary the variable current in the electro-magnet such that the force generated substantially equals a given force demand value whilst permitting the operational gap to vary.

Preferably, a second control means may be associated with each support actuator and may be arranged to detect and generate a second control signal dependent on variations in the operational gap and at least one accelerometer may be mounted to the raft, each accelerometer being arranged to generate a data signal indicative of local motion of the raft at its mounting position. A global controller may be operably arranged to receive the data signal from each accelerometer and the second control signal from each gap sensor and to generate the given force demand values in response to at least one rigid body mode of the raft. The global controller may comprise a modal matrix decomposition function arranged to identify at least one rigid body mode of the raft from the data signal and control signal and an inverse modal matrix function to generate an appropriate given force demand value for each actuator dependant on the identified rigid body mode.

Again the structure carrying each support actuator may be mechanically and resiliently interconnected to the raft for example by one or more mechanical springs, to assist with taking some of the load and reducing the size of the electro-magnet required.

According to a third aspect of the invention a method of spatially coupling a support armature with respect to an electro-magnet comprises generating a force demand value corresponding to a desired rigid body mode of a structure supported by the magnetic field produced by the interaction of the armature and electro-magnet, applying a current to the electro-magnet to generate a magnetic field dependent on the current and arranging the magnetic field to support the support armature with an operational gap therebetween, and controlling the operational gap between the support armature and the electro-magnet by detecting force generated by the electro-magnet and varying the current dependant on the force, thereby generating a force which substantially equals the force demand value whilst permitting the operational gap to vary.

The invention will now be described, by way of example only, with reference to the accompanying drawings, in which.

Figure 2:
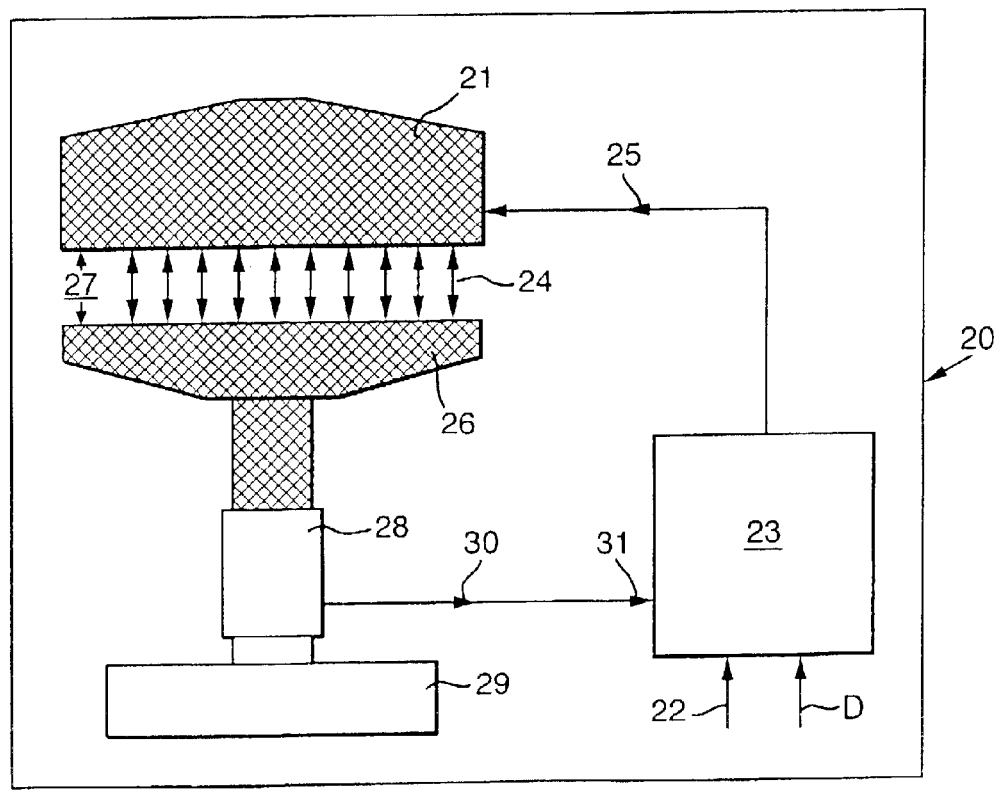
FIG. 2 illustrates a support actuator according to the present invention.
Figure 3:
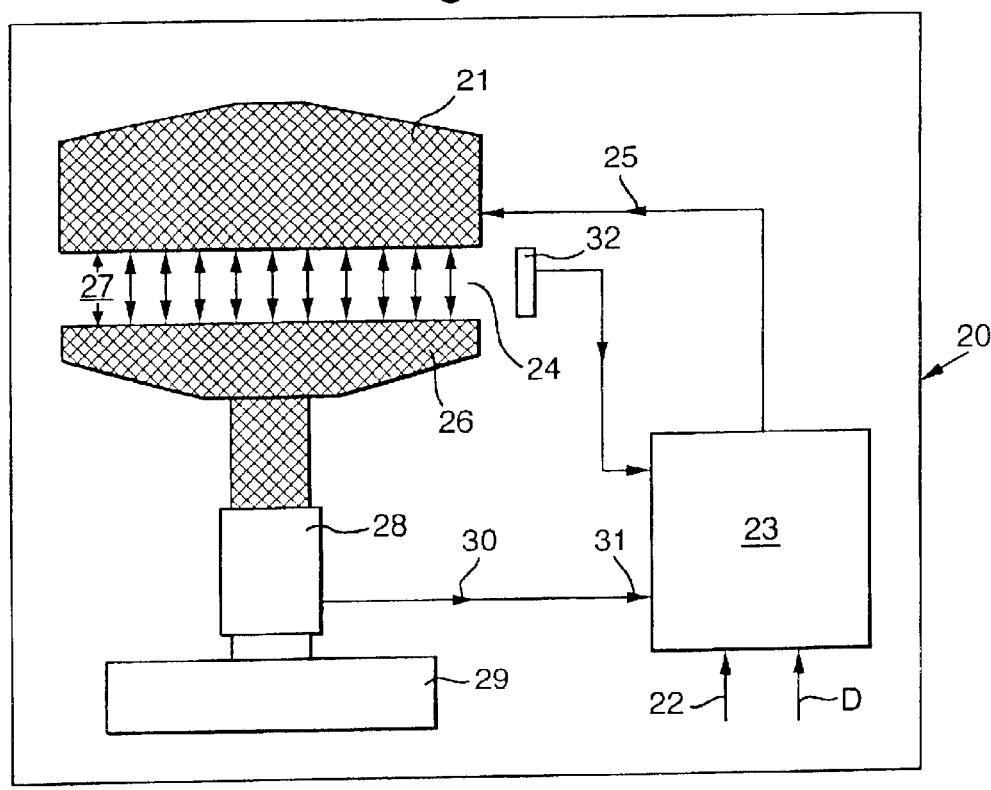
FIG. 3 illustrates an alternative support actuator to that shown in FIG. 2.
Figure 5:
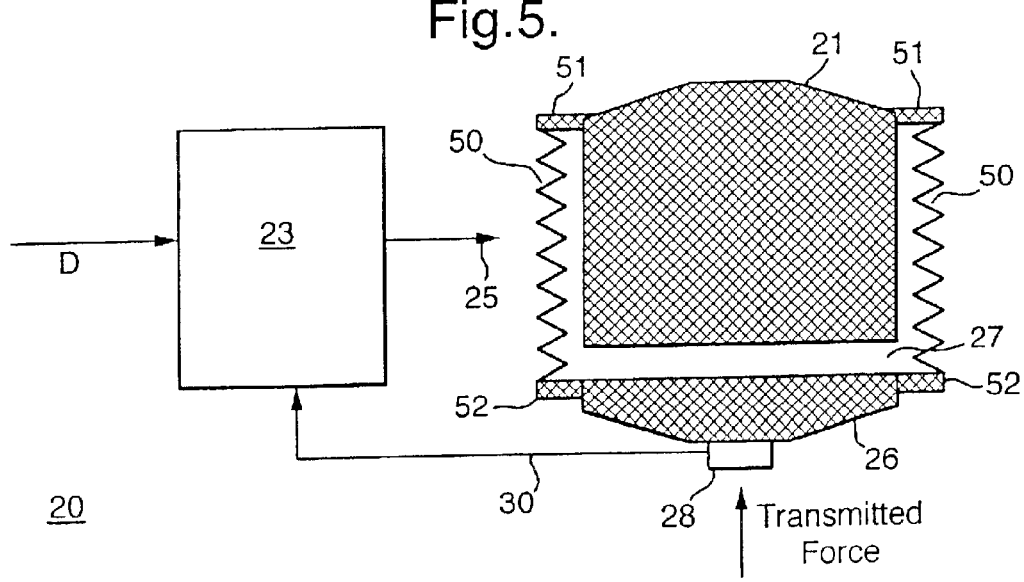

FIG. 4 schematically illustrates global control of a plurality of support actuators according to the present invention;

FIG. 5 schematically illustrates an alternative support actuator to that shown in FIGS. 2 and 3; and FIG. 6 schematically illustrates a global control force demand generating system for a ship support actuator system.

Figure 1:
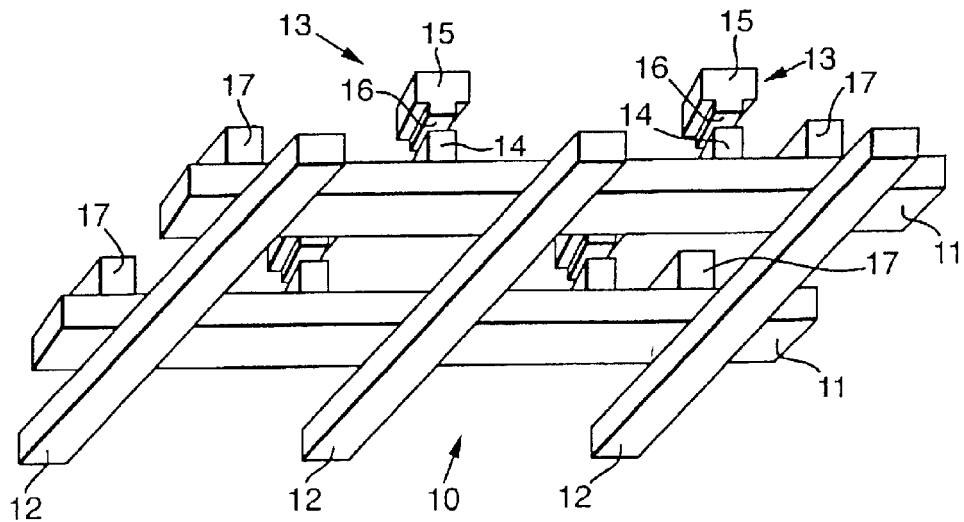
FIG. 1 illustrates generally the apparatus of the present invention.

Referring to FIG. 1, a support apparatus comprises a raft 10 formed from a plurality of flexible intersecting members 11 and 12, the raft 10 being arranged to support a load, not illustrated. The raft 10 also has mounted thereto a plurality of support actuators 13 comprising a support armature 14 spaced from an electro-magnet 15 arranged to generate a magnetic field, not illustrated, so as to maintain the support armature 14 in a spaced relationship with respect to the electro-magnet 15 to define an operational gap 16 therebetween.

It will be understood that by utilizing support actuators 13, rafts 10 can be used to carry a vibrating load, not illustrated, such as machinery. Accordingly, the raft 10 can be flexible as any resonance transferred from the load is completely ignored by the support actuators 13 if correctly controlled.

If the raft 10 was infinitely rigid then there would be no resonance whatsoever and the global control would be simple. However, the raft 10 is expected to resonant if the raft's 10 resonance frequencies are excited.

The inventor has realised that to achieve a collective or global control of all the support actuators 13, each support actuator 13 must be made to generate a force that does not vary with variations in the operational gap 11, caused by resonance generated by the load. The force is dependant on a given force demand value dictated by a global controller (not illustrated) and the force should only change when the global controller dictates that a given force demand should change. Accordingly, the forces generated by all the support actuators 13 can be altered by varying the given force demand for each support actuator 13 so as to restore the raft 10 to a given, original or desired position.

The inventor has further realised that by supporting the raft 10 on its rigid-body modes, that is the mean motions of the raft 10, that the rigid-body modes cannot be excited by any force distribution which has zero net linear or zero net angular momentum. As all flexural modes of the raft 10, that is resonances acting on the raft 10, have zero net linear and zero net angular momentums they will not effect the rigid-body mode control of the raft 10 and should not produce additional global demand forces on a mounting position (not illustrated) to which each electro-magnet 15 is mounted.

Since the rigid-body modes of excitation of the raft 10 are orthogonal to its structural excitation modes it is possible for the global controller to filter out the rigid-body modes and simply ignore any structural modes that become excited.

FIG. 2 illustrates the basic principle of operation of the present invention, wherein a support actuator 20 comprises an electro-magnet 21 operably connected to an input current 22, via a current controller 23 and is arranged to generate a magnetic field 24 having a variable intensity according to a variable current 25 supplied by the current controller 23. The intensity of the magnetic field 24 is controlled to ensure that the electro-magnet 21 is separated from a support armature 26 arranged to carry a load, not illustrated, by an operational gap 27.

This is achieved by operably connecting a load cell 28 between the support armature 26 and a mounting position 29 for the support armature 26. A global force demand D, supplied by a global controller, not illustrated, is supplied to the current controller 23 so as to determine the given force necessary to be produced by the support actuator 20 such that when the support actuator 20 is in operation with a plurality of other support actuators 20 the given force demand D acts to control the rigid body motions. Global control of a plurality of support actuators 20 using a global controller is explained below with reference to FIG. 4.

The load cell 28 is arranged to produce a first control signal 30 representing variations in the force generated by the magnetic field 24 which acts on a load mounted to the mounting position 29, and by feeding the first control signal 30 backwards, along a feedback control path 31 to the current controller 23, to control the variable current 25.

Operation of the current controller 23 is determined by the high gain feedback control path 31 which seeks to make the first control signal 30 substantially equal to the given demand force D by variation of the variable current 25 applied to the electro-magnet 21 to generate the magnetic field 24.

If the support armature 26 is attached to a vibrating load, not illustrated, through the mounting position 29, it will move with respect to the electro-magnet 21 and if the current 25 applied to the electro-magnet 21 were to remain constant then the force exerted by the electro-magnet 21 would vary. However, variations of the force are detected by the load cell 28 and the first control signal 30 is generated depending on the magnitude of the variations in the force. The first control signal 30 and the given demand force D control the input current 22 which is used to generate the variable current 25 that in turn varies the strength of the magnetic field 24 generated by the electro-magnet 21 thereby compensating for variations in the force acting on the support armature 26. In this manner the force generated by the electro-magnet 21 will substantially equal a given demand force D by appropriate variation through the variable current 25 and the force generated will be independent any variations of the operational gap 27.

As frequency increases to the limit of the feedback control path 31, the gain of the control signal 30 rolls off and associated phase shift around the feedback control path 31 changes progressively from −180° to −90° and eventually becomes 0°. As the phase shift changes a negative damping effect is produced by the support actuator 20 which becomes maximum at the frequency corresponding to the −90° phase position. The effect of the negative damping is that it may excite any resonances near the frequency corresponding to the −90° phase position. Any resonance near this −90° position will have energy injected into it by the negative damping. If this negative damping exceeds the natural positive damping, which extracts energy, associated with this mode, then it will be excited—an unwanted situation.

From FIG. 3, in which like references have been used to indicate similar integers to those illustrated in FIG. 2, the control of the electro-magnet 21 can be improved still further by using a gap sensor 32 also to operate the current controller 23 so as to vary the variable current 25. The gap sensor 32 is arranged to measure variations in the operational gap 27 and to produce a second control signal 33 corresponding to any variation. The second control signal 33 is feed forward, along a feedforward control path 34, to the current controller 23 which calculates from the second control signal 33 an anticipation of variations in the force generated by the electro-magnet 21. Anticipation of the variations in the force allows the current controller 23 to vary the variable current 25 such that negative damping is inhibited in the roll off frequency range as the gain of the feedback first control signal 30 decreases with frequency.

In this embodiment, the operation of the current controller 23 is determined by a transfer function of the observed relationship between the given demand force value D, the second control signal 33 and the variable current 25 applied to the electro-magnet 21 to generate the magnetic field 24 such that the electro-magnet 21 will provide a force equal to the given demand force value D independent of gap variations.

By determining the correct transfer function of the current controller 23, the feedforward control path 34 can be biased such that the characteristics of the electro-magnet 21 are radically changed so the electro-magnet 21 will behave like a weak positive spring with phase shifts associated with increasing frequency. This will cause the electro-magnet 21 to behave like a positive damper. The feedforward control path 34 can have a very wide bandwidth compared with simple feedback control, but the precision of control is dependent on the precision of measurements used to determine the transfer function and knowledge of the characteristics of the support actuator 20.

When a feedback control signal 30 is used in conjunction with a feedforward control signal 33, as the gain of the feedback control signal 30 rolls off, negative damping is inhibited and thus resonance is not excited with the roll off in frequency. The combination of a feedback control signal 30 with a feedforward control signal 33 means that the feedforward control signal 33 will progressively take over from the feedback control signal 30 with the increase in frequency.

The control of each support actuator 20 with either a feedback signal 30 from a load cell 28 or a feedforward signal 30 from a gap sensor 32 in combination with a feedback signal 30 from a load cell 28 will hereinafter be referred to as a local control.

It will be understood that the vibrating load can alternatively be attached to the electro-magnet 21 instead of the support armature 26 and the load cell 28 may be connected between the electro-magnet 21 and a mounting position 29 such that the load, not illustrated, is connected to the electro-magnet 21 rather than the support armature 26.

If an array of support actuators 20, each having a local control as described above, are used to support a three dimensional structure, additional global control is required to modify the force demand value D supplied to each support actuator 20 so as to achieve a required mean position and orientation of the structure at predetermined values.

Accordingly, referring again to FIG. 1, the raft 10 has mounted thereon a number of accelerometers 17 which provide a data signal, not illustrated, corresponding to motions of the raft 10 to which each is fixed. Alternatively, some or all the accelerometer 17 may be replaced with a sensor which may detect either the motion or the proximity of a structure, in this case the raft 10, to which it is mounted and produce a data signal corresponding to the motion or proximity or change in motion or proximity of the structure to which it is mounted. Furthermore, an output signal from a gap sensor, not illustrate, associated with each support actuator 13 used for local control, can also be used to provide a second control signal to the global controller. It will be understood that gap sensors independent to those used in local control may be used so as to keep the local and global controls independent.

From FIG. 4, wherein like references have been used to indicate similar integers to those illustrated in FIG. 1, a global controller 40 is located between each accelerometer 17 and gap sensor 42 and each support actuator 13. That is the global controller 40 would also be in a feedback path from each accelerometer 17 and gap sensor 42, through the global controller 40 back to the support actuator 13.

In this case, an array of four accelerometers 17, have been distributed about the raft 10 to calculate three different rigid body modes of the raft 10 so as to control four support actuators 13, which have also been distributed about the raft 10 and have associated therewith four gap sensors 42, one for each support actuator 13. Each accelerometer 17 produces a data signal 41 and each gap sensor 42 produces a second control signal 43 which is received by a rigid body modal transform matrix 44 which calculates the amplitude of the rigid body modes. That is measurements of the operational gap 16 and measurements from the accelerometers 17 provide a detailed analysis of the motions of each part of the raft 10. The amplitude of the rigid body modes gives the deviations of the raft's 10 instantaneous position and orientation from a required mean value.

The modal transform matrix 44 is arranged to produce an excitation output 45 for each rigid body mode to be controlled. In effect, the modal transform matrix 44 spatially filters out particular rigid body modes of the raft 10, that is one corresponding to each excitation output 45, and comprises a model of the properties of the raft 10. Each excitation output 45 is used to feed a control algorithm 46, one for each rigid body mode to be controlled, in this case three rigid body modes. Each control algorithm 46 is arranged to generate a modal control demand force 47 which will return the raft 10 to its required mean position and orientation in a given manner. This could include damping of the raft 10 such that it eventually comes to rest.

Each modal control demand force 47 is transformed by an inverse modal transform matrix 48 into given force demand values D, which are used to control each support actuator 13. It will be understood that although four accelerometers 17 and gap sensors 42 are used to provide respectively data signals 41 and second control signals 42 to control four support actuators 13, the numbers of accelerometers 17 or support actuators 13, and hence associated gap sensors 42, may be varied depending on the application and that this in turn effects the size of modal transform matrix 43 and of inverse modal transform matrix 48. Furthermore, the number of control algorithms 46 required will vary depending on the number of rigid body modes to be detected and controlled—the maximum number of rigid-body modes is, of course, six. Normally one would control all six rigid-body modes.

In effect, the global controller 40 measures the instantaneous position and orientation of the raft 10 using data signals 41 and second control signals 43. The combination of the modal transform matrix 44, algorithms 46 and inverse modal transform matrix 48 provides a calculation of the given demand force values D for each support actuator 13 so as to return the raft 10 to its predetermined mean position and orientation at a predetermined rate.

The mean motions of the raft 10 are its rigid body motions. If the raft 10 should be excited at one of its resonant frequencies, quite large amplitude local displacements of the raft 10 can be generated. While these displacements will not change the forces generated by each support actuator 13, as force is maintained at a given force demand value D by local control, such displacements might be expected to modify the instantaneous mean position and orientation of the raft 10.

An advantage of the present invention is that motions generated in the raft 10 by resonance are orthogonal to the raft's 10 rigid body motions. A consequence of this is that any resonance of the raft 10, although it may change each operational gap 16, does not change the rigid body modes of the raft 10 such that the global controller 40 simply ignores any resonance and no additional forces will be generated in response to the excitation of any resonance of the raft 10. That is all low frequency resonances of the raft 10 that lie within the same bandwidth of the local control are ignored.

The construction of modal transform matrix 44, algorithms 46 and inverse modal transform matrix 48 and their coefficients are dependent on the application and may be determined from analysis or empirical methods prior to mounting the accelerometers 17 and support actuators 13 or once the accelerometers 17 and support actuators 13 have been mounted to the raft 10.

It will be understood that a minimum of six support actuators 13 would be required for a raft 10 to be operational in three dimensions as there are six rigid body modes to be controlled.

FIG. 5 shows an alternative form of support actuator 20 to those shown in FIGS. 2 and 3 and in which like references have been used to indicate similar integers. In this embodiment the structure supporting the electro-magnet 21 and the structure supporting the support armature 26 are provided with spring support lugs 51 and 52 respectively. A pair of parallel mechanical springs 50 extend between the lugs 51 and 52. The springs 50 help to take some of the supported load (not shown) and consequently the electro-magnet 21 may be designed with reduced size in comparison with those used in the embodiments shown in FIGS. 2 and 3.

FIG. 6 shows a system for generating the global force demand signal D for the outer global feedforward demand signal D to be fed into the current controller 23 of one of the embodiments of the support actuator shown in FIG. 2, 3 or 5. The system shown is for use in a ship application where rigid body modes of both ship machinery and the hull are to be extracted. Accelerometers 52 and 53 provide signals 52' and 53' dependent on hull and machinery accelerations and displacements respectively to hull rigid body modes and machinery rigid body modes signal generators 54 and 55 respectively. The output of the hull signal generator 54 is multiplied by the appropriate mass in the circuit 56 and applied to one input of an operational amplifier 58 whilst the machinery signal generator 55 output is fed via a frequency dependent stiffness function circuit 57 to a second input of the operational amplifier 58. The combined output of the operational amplifier 58 is fed into an inverse modal transform circuit 59 to generate the global modal force demand signal D thus making the machinery track the hull's motions. When the demand signal D is fed into the feedforward input of the current controller 23 of one of the support actuators shown in FIG. 2 or 3 or 5, the support actuator is given a constant positioning capability and separates this requirement from the vibration isolation performance which is controlled by the feedback circuit to the current controllers 23.

In embodiments such as that shown in FIG. 4, where there is a plurality of support actuators acting on a load carrying raft, the individual global force demands for each support actuator are calculated by the inverse transform circuit 59.

The key feature of the system shown in FIG. 6 is that mechanical resonances in the ship machinery are filtered out of the observation system (accelerometers or proximity sensors) and ignored by the local zero stiffness springs as represented by the support actuators. The only forces transmitted to the hull result from the global spring action in response to displacements of the machinery's rigid body modes.

What is claimed is:

1. A support apparatus comprising:
    a plurality of electro-magnetic support actuators arranged in an array and coupled to a mounting of a load, so as to support the mounting and the load by electro-magnetic levitation, wherein each support actuator comprises:
    a current controller operable to produce a variable current;
    an electro-magnet connected to receive the variable current and to generate a magnetic field dependant on the variable current;
    a support armature separated from the electro-magnet by an operational gap and supported by the magnetic field;
    a first control means arranged to detect force generated by the electro-magnet and to operate the current controller dependant on variations in the force generated, and the first control means being arranged to vary the variable current in the electro-magnet such that the force generated substantially equals a given force demand value, whilst permitting the operational gap to vary; and
    means for generating said force demand value for each support actuator comprising:
    a plurality of displacement measurement devices attached to the mounting at selected points; and
    a global demand controller arranged to utilise data signals from the displacement measurement devices to generate signals relating to rigid body modes of movement of the mounting for each of the support actuators and to generate therefrom, signals representing said force demand values, for maintaining a mean position of said mounting.

2. A support apparatus as claimed in claim 1 and wherein the global demand controller comprises a modal transform matrix responsive to the data signals to produce excitation signals, a plurality of control algorithm units, one for each rigid body mode of vibration to be controlled, responsive to the excitation signals to produce modal demand force signals, and an inverse modal transform matrix for transforming the modal demand force signals into the force demand value signals for each support actuator.

3. A support apparatus as claimed in claim 2, wherein a second control means associated with each support actuator is arranged to detect variations in the operational gap so as to anticipate force variations and to generate a second control signal dependant on variations in the operational gap.

4. A support apparatus as claimed in claim 1, wherein the displacement measurement devices comprise accelerometers each accelerometer being arranged to generate a data signal indicative of local motion of the mounting at its point of attachment.

5. A support apparatus as claimed in claim 3, wherein the global controller is operably arranged to receive the data signals from each displacement measurement device and the second control signals from the second control means indicative of the gaps between each electro-magnet and armature of each support actuator with which to generate the given force demand value in response to at least one rigid body mode of the mounting.

6. A support apparatus as claimed in claim 5, wherein the global demand controller further comprises a modal matrix decomposition function arranged to identify at least one rigid body mode of the mounting from the data signals and the second control signals and an inverse modal matrix function to generate an appropriate given force demand value for each individual support actuator dependant on each identified rigid body mode.

7. A support apparatus as claimed in claim 1 and further comprising a mechanical resilient connection between the mounting and the support structure.

8. A support apparatus as claimed in claim 7 and wherein the mechanical resilient connection comprises at least one mechanical spring.

9. A method of supporting a load by means of electro-magnetic levitation comprising:

providing a plurality of electromagnetic support actuators in an array to support a mounting of a load, each support actuator producing a variable current, and providing the variable current to a respective electro-magnet to generate a magnetic field dependent on the variable current;

providing in each support actuator a support armature separated from the electro magnet by an operational gap and supported by the magnetic field;

detecting the force generated by the electro-magnet and varying the current in the electro-magnet such that the force generated substantially equals a given force demand value whilst permitting the operational gap to vary;

wherein the force demand value for each support actuator is generated by measuring at selected points of said support structure the displacement thereof;

providing signals representative of the displacements and generating therefrom signals relating to rigid body modes of vibration of the mounting for each of the support actuators; and generating from the signals relating to rigid body modes of vibration said force demand values, for maintaining a mean position of said mounting.

10. A method according to claim 9 comprising providing a modal transform matrix which responds to said displacement signals to produce excitation signals and producing from each excitation signal by means of a control algorithm said modal control demand force signals, and transforming the modal control demand force signals by means of an inverse modal transform matrix to said force demand values.

11. A method as claimed in claim 9 comprising detecting variations in said operational gap so as to anticipate force variations, and generating a second control signal dependent on variations in the operational gap, and employing the second control signal to generate said force demand values.

12. A method as claimed in claim 11 comprising identifying at least one rigid body mode of the support structure from the displacement signals by means of a modal matrix decomposition function and the gap control signal, and generating an appropriate force demand value by means of an inverse modal matrix function.

13. A support apparatus comprising a plurality of electro-magnetic support actuators arranged in an array positioned on a mounting of a load so as to support the mounting by electro-magnetic levitation, a plurality of displacement measurement devices attached to the mounting at selected points, and a global demand controller arranged to utilise data signals from the displacement measurement devices to generate modal control demand signals relating to rigid body modes of movement of the mounting for each of the support actuators so as to control the mean position of the mounting.

14. A support apparatus as claimed in claim 13, and wherein the global demand controller comprises a modal transform matrix responsive to the data signals to produce excitation signals, a plurality of control algorithm units, one for each rigid body mode of vibration to be controlled, responsive to the excitation signals to produce modal demand force signals, and an inverse modal transform matrix for transforming the modal demand force signals into the modal demand value signals for each support actuator.

15. A support apparatus as claimed in claim 13, and wherein each support actuator comprises a current controller operable to produce a variable current, an electro-magnet connected to receive the variable current and to generate a magnetic field dependant on the variable current, a support armature separated from the electro-magnet by an operational gap and supported by the magnetic field, a first control means arranged to detect force generated by the electro-magnet and to operate the current controller dependant on variations in the force generated, and the first control means being arranged to vary the variable current in the electro-magnet such that the force generated substantially equals a given force demand value.

16. A support apparatus as claimed in claim 15, wherein a second control means associated with each support actuator is arranged to detect variations in the operational gap so as to anticipate force variations and to generate a second control signal dependant on variations in the operational gap.

17. A support apparatus as claimed in claim 13, wherein the displacement measurement devices comprise accelerometers each accelerometer being arranged to generate a data signal indicative of local motion of the mounting at its point of attachment.

18. A support apparatus as claimed in claim 16, wherein the global controller is operably arranged to receive the data signals from each displacement measurement device and the second control signals from the second control means indicative of the gaps between each electro-magnet and armature of each support actuator with which to generate the given force demand value in response to at least one rigid body mode of the mounting.

19. A support apparatus as claimed in claim 18, wherein the global demand controller further comprises a modal matrix decomposition function arranged to identify at least one rigid body mode of the mounting from the data signals and the second control signals and an inverse modal matrix function to generate an appropriate given force demand value for each individual support actuator dependant on each identified rigid body mode.

20. A support apparatus as claimed in claim 13 and further comprising a mechanical resilient connection between the mounting and the support structure.

21. A support apparatus as claimed in claim 20 and wherein the mechanical resilient connection comprises at least one mechanical spring.

* * * * *